(12) United States Patent
Campbell et al.

(10) Patent No.: US 8,911,206 B2
Campbell et al.
(45) Date of Patent: Dec. 16, 2014

(54) BRUSH-TYPE SEAL FOR AN AIR-HANDLING UNIT

(75) Inventors: Lonnie R. Campbell, Winchester, KY (US); Joseph A. Wells, Versailles, KY (US); Thomas N. McLain, Lexington, KY (US); David B. Sweet, Lexington, KY (US)

(73) Assignee: Trane International Inc., Piscataway, NJ (US)

( * ) Notice: Subject to any disclaimer, the term of this patent is extended or adjusted under 35 U.S.C. 154(b) by 781 days.

(21) Appl. No.: 12/965,352

(22) Filed: Dec. 10, 2010

(65) Prior Publication Data

US 2012/0148398 A1 Jun. 14, 2012

(51) Int. Cl.
*F04D 29/44* (2006.01)
*F03D 11/00* (2006.01)

(52) U.S. Cl.
CPC ........... *F03D 11/00* (2013.01); *F05B 2240/571* (2013.01); *Y02E 10/722* (2013.01)
USPC ...................................................... 415/204

(58) Field of Classification Search
USPC ........... 415/211.2, 206, 224, 119, 214.1, 204, 415/126, 128; 277/355
See application file for complete search history.

(56) References Cited

U.S. PATENT DOCUMENTS

| | | | |
|---|---|---|---|
| 2,830,524 A | | 4/1958 | Breidert |
| 3,125,286 A | * | 3/1964 | Sander .......................... 415/119 |
| 3,421,297 A | | 1/1969 | Dahlem |
| 4,781,388 A | * | 11/1988 | Wohrl et al. ................... 277/355 |
| 4,882,826 A | | 11/1989 | Belanger et al. |
| 5,265,412 A | * | 11/1993 | Bagepalli et al. ................ 60/800 |
| 5,420,469 A | * | 5/1995 | Schmidt .......................... 310/53 |
| 6,217,277 B1 | | 4/2001 | Liu et al. |
| 6,986,708 B2 | * | 1/2006 | Demster ........................ 454/248 |
| 2008/0148640 A1 | * | 6/2008 | Marron ........................... 49/355 |
| 2008/0309017 A1 | * | 12/2008 | Mattice .......................... 277/355 |

* cited by examiner

*Primary Examiner* — Edward Look
*Assistant Examiner* — William Grigos
(74) *Attorney, Agent, or Firm* — Hamre, Schumann, Mueller & Larson, P.C.

(57) ABSTRACT

An air-handling unit including a housing with a discharge opening, and a fan disposed substantially within the housing. The fan includes a fan discharge that extends through the discharge opening thereby defining a gap between the fan discharge and the housing surrounding the discharge opening. A brush seal is coupled to one of the housing about the discharge opening and the fan discharge such that the brush seal extends across the gap forming a seal between the discharge opening and the fan discharge.

13 Claims, 5 Drawing Sheets

BRUSH-TYPE SEAL FOR AN AIR-HANDLING UNIT

BACKGROUND

The present invention relates to a brush-type seal for an air-handling unit for a heating, ventilating, and air conditioning system.

Seals for air-handling units typically include a flexible duct material made from a neoprene-coated canvas material. The flexible duct is often attached at one end to a fan discharge using metallic strips and fasteners, and attached at the other end to a fabricated metallic duct or housing by similar metallic strips and fasteners.

SUMMARY

In one embodiment, the invention provides an air-handling unit that includes a housing with a discharge opening and a fan disposed substantially within the housing. The fan has a fan discharge that extends through the discharge opening thereby defining a gap between the fan discharge and the housing surrounding the discharge opening. The air-handling unit also includes a brush seal that is coupled to one of the housing about the discharge opening and the fan discharge such that the brush seal extends across the gap forming a seal between the discharge opening and the fan discharge.

In another embodiment, the invention provides a fan and duct assembly for a heating, ventilating, and air conditioning unit. The fan and duct assembly includes a duct and a fan having a fan discharge directing air into the duct. The duct and the fan discharge overlap each other and define a gap between the overlapping portions of the duct and the fan discharge. The fan and duct assembly also includes a brush seal coupled to one of the duct and the fan discharge such that the brush seal extends across the gap forming a seal between the duct and the fan discharge.

In yet another embodiment, the invention provides an air-handling unit that includes a housing with a discharge opening and a fan disposed substantially within the housing. The fan has a fan discharge that extends through the discharge opening thereby defining a gap between the fan discharge and the housing surrounding the discharge opening. The air-handling unit also includes a brush seal that is coupled to one of the housing about the discharge opening and the fan discharge such that the brush seal extends across the gap forming a seal between the discharge opening and the fan discharge. The fan discharge has a perimeter and the brush seal extends around the entire perimeter. The discharge opening is rectangular-shaped and the brush seal includes a plurality of brushes. At least two of the plurality of brushes overlap with each other. Each brush includes nylon bristles on one side and a metal holder assembly securing the nylon bristles at the other side. Each metal holder assembly is coupled to the housing and the nylon bristles are directed toward and contact the fan discharge.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
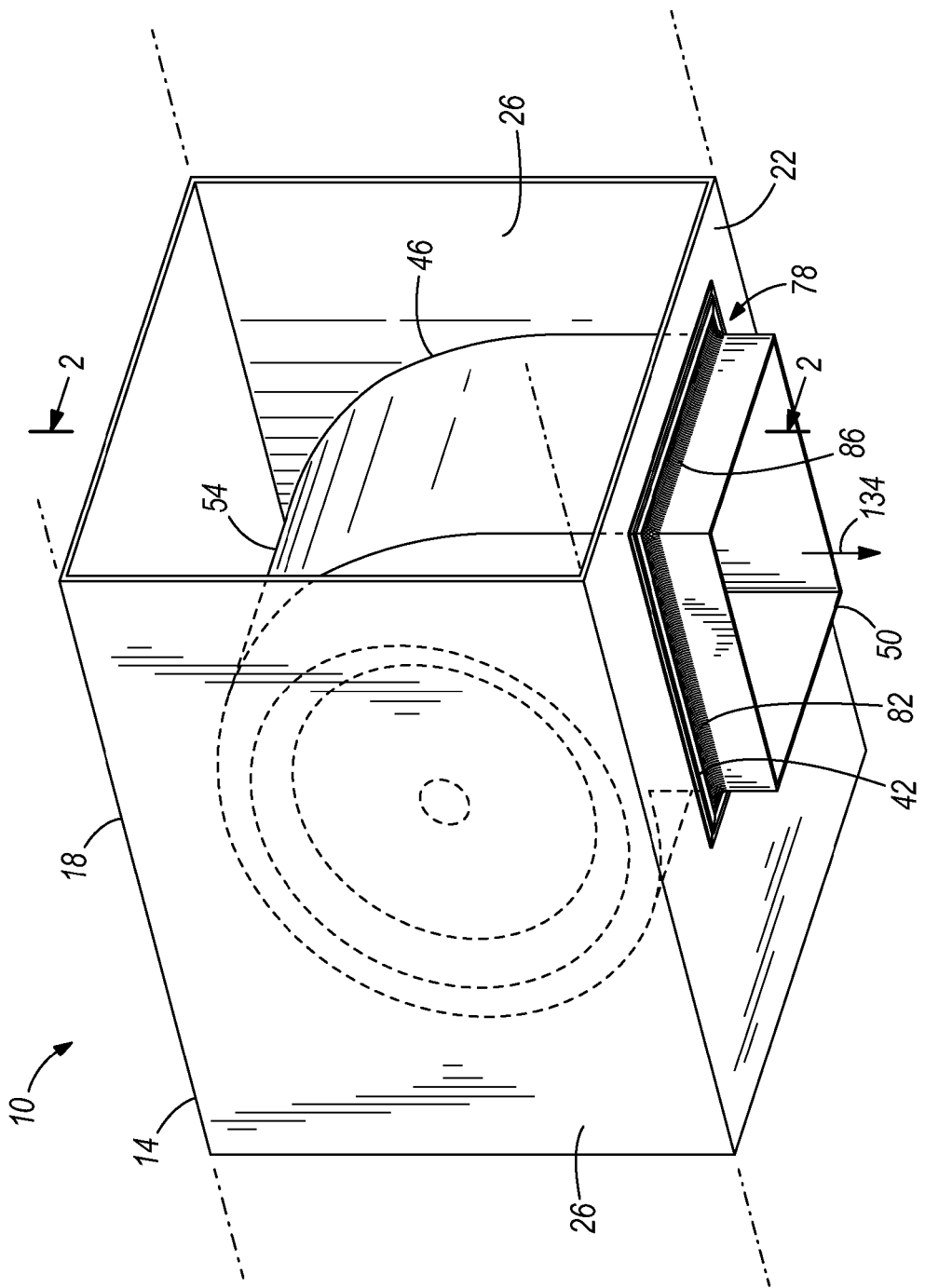
FIG. 1 is a perspective view of an air-handling unit according to one embodiment of the invention.
Figure 2:
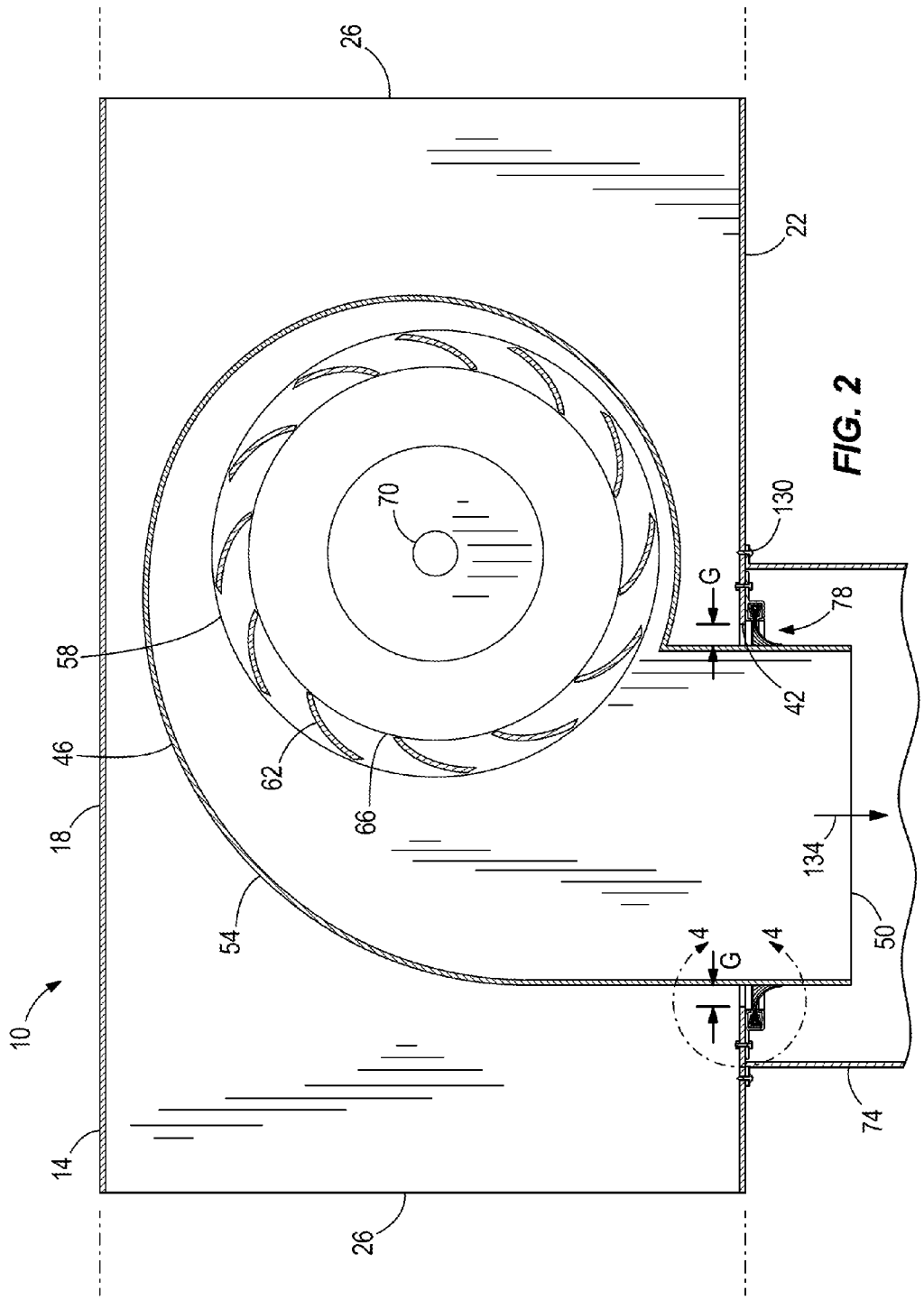
FIG. 2 is a cross-sectional view of the air-handling unit of FIG. 1.

FIGS. 1 and 2 illustrate an air-handling unit 10 according to one embodiment of the invention. The air-handling unit 10 is used with a heating, ventilating, and air conditioning system (not shown) to distribute heated or conditioned air through a building (not shown). Although not shown, the air-handling unit 10 also may include, among other things, heating and cooling coils that add and remove heat to air that will be distributed to the inside of the building.

The air-handling unit 10 includes a housing 14 including a top wall 18, a bottom wall 22, and side walls 26 connecting the top and bottom walls 18, 22. The bottom wall 22 includes a rectangular discharge opening 42. The walls 18, 22, 26 are formed from sheet steel. In other constructions, the discharge opening 42 could be located on any of the other walls 18, 26 thereby changing the orientation and direction of the discharge air.

The air-handling unit 10 includes a fan 46 disposed substantially within the housing 14. The fan 46 includes a rectangular fan discharge 50 that extends through the discharge opening 42 defining a gap G (FIG. 4) between the fan discharge 50 and the housing 14 surrounding the discharge opening 42. As best seen in FIG. 2, the fan 46 is a centrifugal fan (i.e., a squirrel-cage fan) that includes a fan housing 54 and a fan wheel 58 rotatably coupled within the fan housing 54. The fan wheel 58 includes a number of fan blades 62 mounted around a hub 66. The hub 66 is connected to a driveshaft 70 that is rotatably driven by a motor (not shown). Air enters from the side of the fan wheel 58, turns ninety degrees, accelerates due to centrifugal force as it flows over the fan blades 62, and exits from the fan discharge 50.

FIG. 2 illustrates a discharge duct 74 extending away from the housing 14. The discharge duct 74 is generally rectangular in cross-section and is coupled to the housing 14 about the discharge opening 42. The discharge duct 74 receives and directs the air exiting the fan discharge 50.

Figure 3:
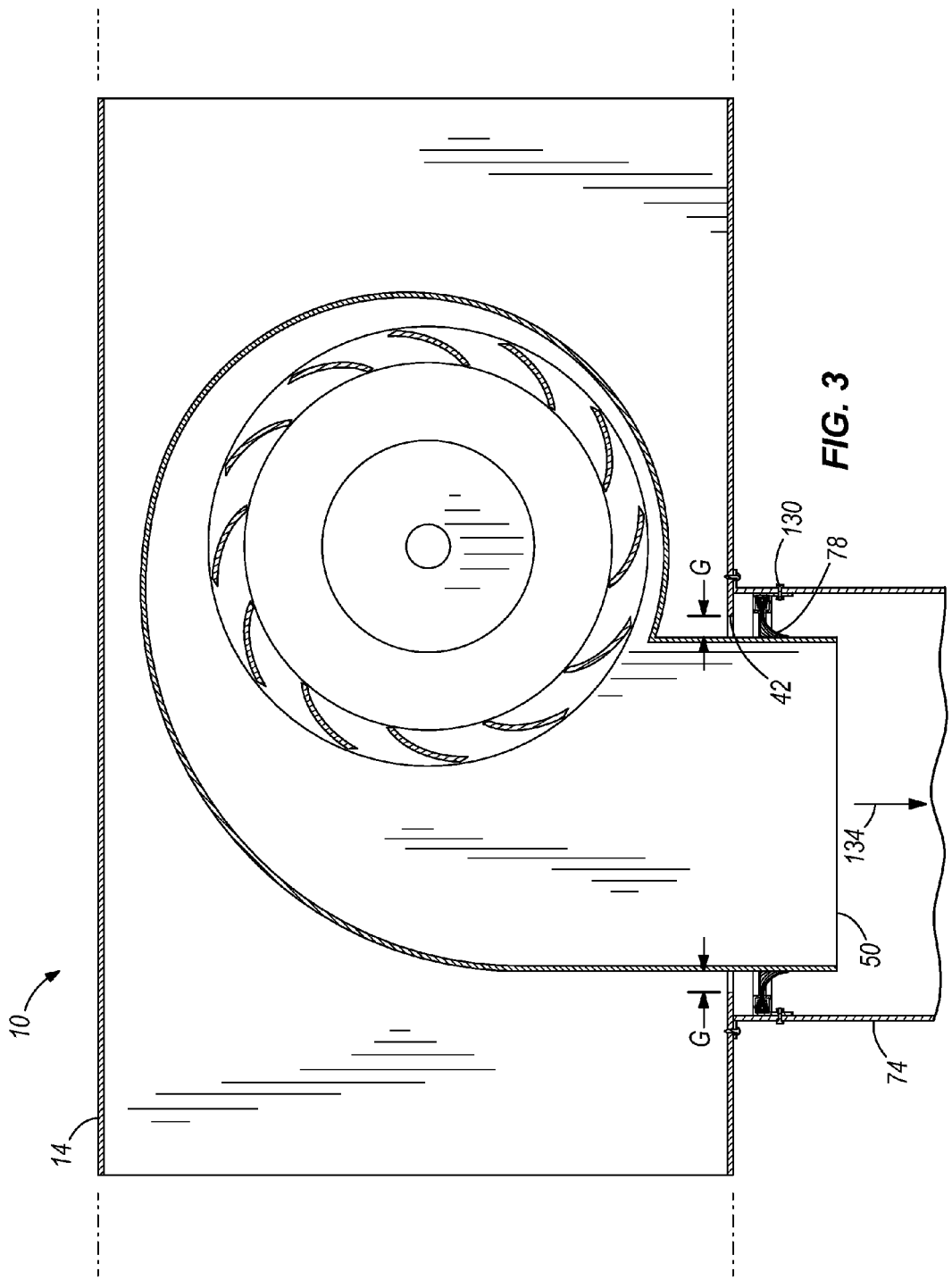
FIG. 3 is a cross-sectional view of an air-handling unit according to another embodiment of the invention.
Figure 4:
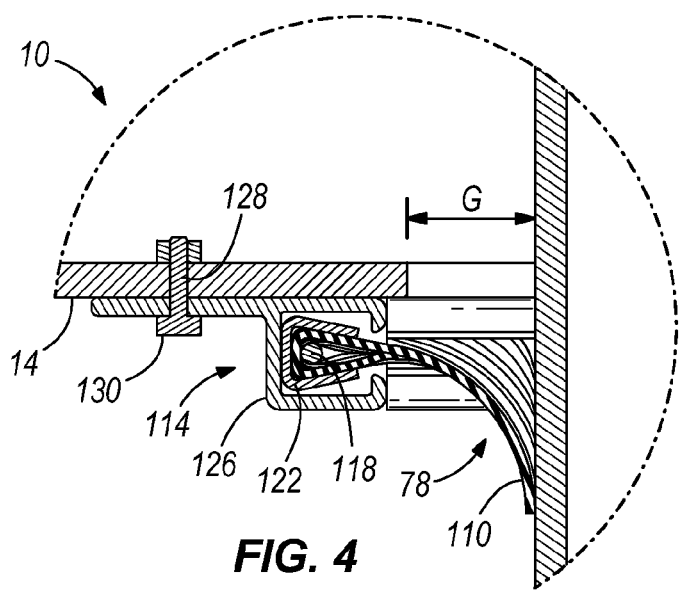
FIG. 4 is an enlarged cross-sectional view of a portion of the air-handling unit of FIG. 2.
Figure 5:
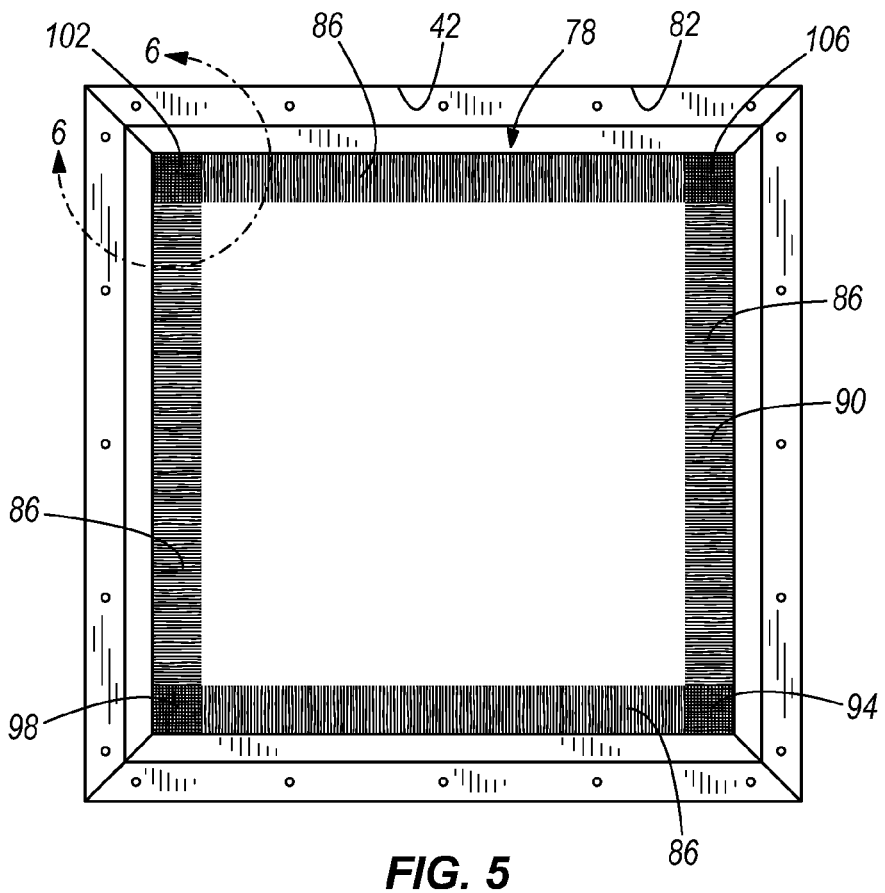
FIG. 5 is a partial bottom view of the air-handling unit of FIG. 1.
Figure 6:
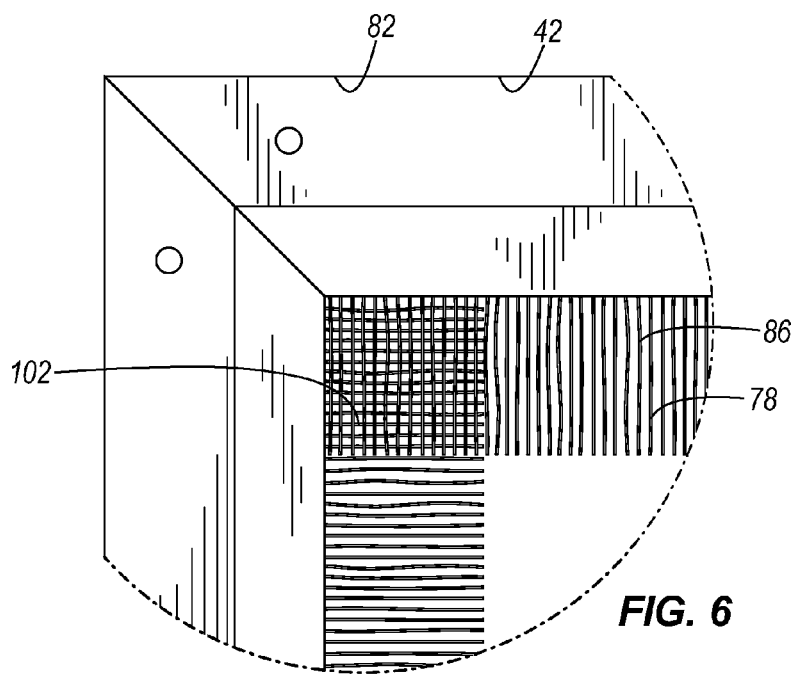
FIG. 6 is an enlarged bottom view of a portion of the air-handling unit of FIG. 5.

The air-handling unit 10 also includes a brush seal 78 coupled to the housing 14 about the discharge opening 42. In the construction illustrated in FIG. 2, the brush seal 78 is coupled to the housing 14 about the discharge opening 42 such that the brush seal 78 extends across the gap G forming a seal between the discharge opening 42 and the fan discharge 50 (see also FIG. 4). As best seen in FIGS. 1 and 5, the brush seal 78 is coupled to the housing 14 about the discharge opening 42 and extends around an entire perimeter 82 of the discharge opening 42 and the fan discharge 50. The brush seal 78 includes four brushes 86 forming a rectangle 90. Adjacent pairs of the brushes 86 overlap with each other at corners 94, 98, 102, 106 of the discharge opening 42 (see FIGS. 5 and 6). Alternatively, the brush seal 78 may be coupled to the fan discharge 50 such that the brush seal 78 extends across the gap G forming a seal between the discharge opening 42 and the fan discharge 50 (not shown). In other constructions like the one shown in FIG. 3, the brush seal 78 may be coupled to the discharge duct 74 such that the brush seal 78 extends across a gap G formed between overlapping portions of the discharge duct 74 and the fan discharge 50.

Figure 7:
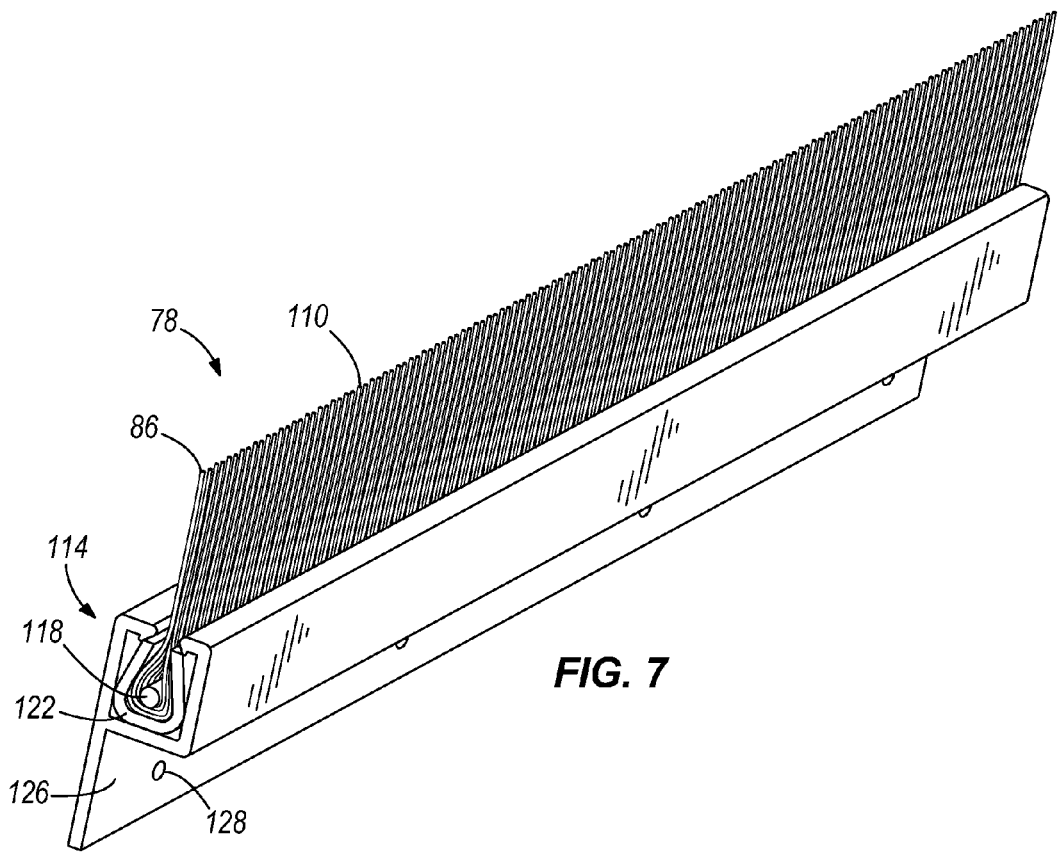
FIG. 7 is a perspective view of a brush according to another embodiment of the invention.

As shown in FIG. 7, each brush 86 includes nylon bristles 110 on one side and a metal holder assembly 114 securing the nylon bristles 110 at the other side. Further, as best seen in FIG. 4, the metal holder assembly 114 includes a rod 118, a clamp 122, and a mounting bracket 126 with a series of mounting holes 128. The mounting holes 128 are configured to receive fasteners 130 (FIG. 4) for coupling the brush 78 to the housing 14 or other structure of the air-handling unit 10 such that the nylon bristles 110 may be directed toward, and contact, the corresponding structure across the gap G.

In operation, the air-handling unit 10 generates an airflow 134 that travels through the air-handling unit 10 to cool or heat a space. The airflow enters the fan 46 disposed within the housing 14 and exits the fan 46 at the fan discharge 50, which extends through the discharge opening 42 in the housing 14. The airflow 134 is substantially prevented from passing through the gap G defined between the fan discharge 50 and the housing 14 surrounding the discharge opening 42 by a brush-type seal 78. The brush-type seal 78 extends across the gap G forming a seal between the discharge opening 42 and the fan discharge 50.

Various features and advantages of the invention are set forth in the following claims.

What is claimed is:

1. An air-handling unit comprising:
a housing with a discharge opening;
a fan disposed substantially within the housing, the fan having a fan discharge that extends through the discharge opening thereby defining a gap between the fan discharge and the housing surrounding the discharge opening; and
a brush seal coupled to one of the housing about the discharge opening and the fan discharge such that the brush seal extends across the gap forming a seal between the discharge opening and the fan discharge,
wherein the discharge opening has a perimeter and the brush seal extends around the entire perimeter, and
the brush seal includes a plurality of brushes, wherein at least two of the plurality of brushes overlap with each other at a corner of the discharge opening.

2. The air-handling unit of claim 1, wherein the fan discharge has a perimeter and the brush seal extends around the entire perimeter.

3. The air-handling unit of claim 1, wherein the brush seal is coupled to the housing about the discharge opening.

4. The air-handling unit of claim 1, wherein the brush seal includes a brush having nylon bristles.

5. The air-handling unit of claim 1, wherein the brush seal includes a brush having nylon bristles on one side and a metal holder assembly securing the nylon bristles at the other side.

6. The air-handling unit of claim 5, wherein the metal holder assembly is coupled to the housing and the nylon bristles are directed toward and contact the fan discharge.

7. A fan and duct assembly for a heating, ventilating, and air conditioning unit, the fan and duct assembly comprising:
a duct;
a fan having a fan discharge directing air into the duct, the duct and the fan discharge overlapping each other and defining a gap between the overlapping portion of the duct and the fan discharge; and
a brush seal coupled to one of the overlapping portion of the duct and the fan discharge such that the brush seal extends across the gap forming a seal between the duct and the fan discharge,
wherein the overlapping portion of the duct has a perimeter and the brush seal extends around the entire perimeter, and
the brush seal includes a plurality of brushes, wherein at least two of the plurality of brushes overlap at a corner of the overlapping portion of the duct.

8. The fan assembly of claim 7, wherein the fan discharge has a perimeter and the brush seal extends around the entire perimeter.

9. The fan assembly of claim 7, wherein the brush seal is coupled to the overlapping portion of the duct.

10. The fan and duct assembly of claim 7, wherein the brush seal includes a brush having nylon bristles.

11. The fan and duct assembly of claim 7, wherein the brush seal includes a brush having nylon bristles on one side and a metal holder assembly securing the nylon bristles at the other side.

12. The fan and duct assembly of claim 11, wherein the metal holder assembly is coupled to the overlapping portion of the duct and the nylon bristles are directed toward and contact the fan discharge.

13. An air-handling unit comprising:
a housing with a discharge opening;
a fan disposed substantially within the housing, the fan having a discharge that extends through the discharge opening thereby defining a gap between the fan discharge and the housing surrounding the discharge opening; and
a brush seal coupled to one of the housing about the discharge opening and the fan discharge such that the brush seal extends across the gap forming a seal between the discharge opening and the fan discharge, wherein the fan discharge has a perimeter and the brush seal is coupled to the housing and extends around the entire perimeter, wherein the discharge opening is rectangular-shaped and the brush seal includes a plurality of brushes, wherein at least two of the plurality of brushes overlap with each other, wherein each of the plurality of brushes includes nylon bristles on one side and a metal holder assembly securing the nylon bristles at the other side, and wherein each of the metal holder assemblies is coupled to the housing and the nylon bristles are directed toward and contact the fan discharge.

* * * * *